Dec. 31, 1935.  W. M. HURST ET AL  2,026,499

SEED DUSTING MACHINE

Filed Aug. 1, 1935

Inventors
Wilbur M. Hurst
Franklin D. Fulton
per
Attorney

Patented Dec. 31, 1935

2,026,499

UNITED STATES PATENT OFFICE 2,026,499

SEED DUSTING MACHINE

Wilbur M. Hurst and Franklin D. Fulton, Washington, D. C.; dedicated to the free use of the Public Application August 1, 1935, Serial No. 34,256

5 Claims. (Cl. 221—96)

(Granted under the act of March 3, 1883, as amended April 30, 1928; 370 O. G. 757)

This application is made under the Act of March 3, 1883, as amended by the Act of April 30, 1928, and the invention herein described and claimed may be manufactured and used by or for the Government for governmental purposes without the payment to us of any royalty thereon.

We hereby dedicate the invention herein described to the free use of the public, to take effect upon the granting of a patent to us.

Our invention relates to automatic seed treating and measuring machines for use about mills, warehouses, elevators or by large farm operators using seed in large quantities where it is necessary to apply fungicide dusts rapidly, economically, and efficiently.

The primary object is to provide a seed dusting device for treating grain such as wheat, oats, and barley with a dry powdered fungicide to protect the seed against the ravages of smut and other diseases.

An important object of the invention is to accurately and automatically apply a definite quantity of dust to an automatically weight measured quantity of grain, for mixing therewith.

Another object is to provide means whereby both the weighing of the grain and the feeding of dust thereto is accomplished through gravity action of the falling grain.

A further object is to provide a simple, easily constructed device for treating grain or other seed that will be continuous in operation; that will not clog or stop; that will automatically feed a uniform quantity of dust without bridging, arching, packing or clogging of said dust, to an automatically measured quantity of seed.

A still further object is to provide means whereby the operation of the dust feeding means acts as a buffer and cushions the movement of the weighing device as said device nears the end of its movement.

Fungicides in dust form, when used for treating wheat and other seed, usually have a very great angle of repose. Due to the high coefficient of friction, such materials will not flow readily down an incline and pack and bridge easily. This tendency to remain immobile and to form a vertical hollow column or well, or to bridge above an opening in the bottom of a hopper, has heretofore been an obstacle rendering it impossible to obtain a uniform feeding of the material, which is a prerequisite for effective treatment of the seed. Efforts to dislodge this material when packed have required considerable power, due to the friction and weight of the material, requiring heavy paddles or agitators.

In our invention we employ a partitioned dust hopper having an offset or supply section and a main or discharge section, so that the discharge means operates under a uniform and minimum head and very little power is required. The dust is ejected or fed from the discharge section of the hopper through openings above the bottom thereof by a reciprocating slide resting on said bottom and substantially the width of said bottom.

Although the machine is applicable to measuring and proportioning a variety of materials, the words grain and dust will hereafter be used in the specification to indicate the specific materials.

Referring to the drawing, illustrating one embodiment of our invention, wherein like numerals of references refer to corresponding parts throughout the two views.

Figure 1:
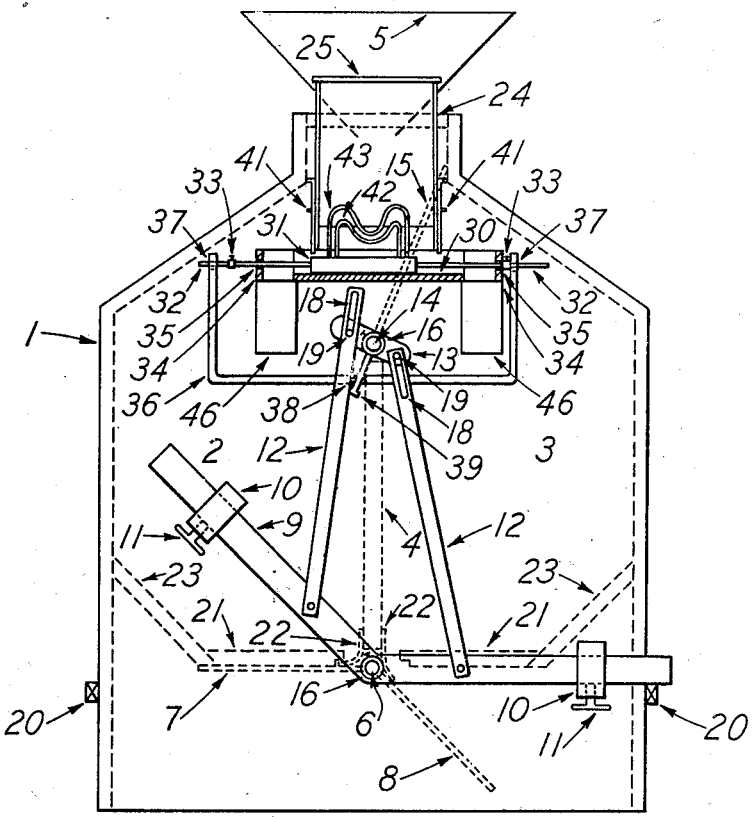
Figure 1 is a front elevation, partly in section, of an automatic seed dusting machine constructed in accordance with our invention.

Referring more in detail to the drawings, our machine comprises a seed receptacle 1, provided with a plurality of compartments 2 and 3 by means of a partition 4. A receiving hopper 5 is mounted at the top of receptacle 1. A shaft 6 extends transversely through receptacle 1, and to this shaft valve plates 7 and 8 are secured, said valve plates 7 and 8 forming bottoms or closures for compartments 2 and 3, respectively, and being arranged so that when one is closed the other will be open. A lower rocker arm 9, in the form of an obtuse angle, carrying weights 10 slidably mounted by means of screws 11, is fixed to shaft 6. Connecting bars 12 extend from said lower rocker arm 9 to an upper rocker arm 13 fixed to an upper shaft 14, which carries an upper valve or deflector plate 15. Shafts 6 and 14 are held in place by collars 16 and set screws 17. Bars 12 are each provided with a slot 18 for a pin 19 on upper rocker arm 13 so that lower valve plate 7 or 8 will be nearly closed before upper valve 15 shifts, thus preventing incoming grain from interfering with or retarding the closing of said lower valve plate 7 or 8. Lower rocker arm 9 is made longer than upper rocker arm 13 to permit quick shifting of upper valve 15 when slotted bar 12 engages pin 19. Stops 20, fastened to and projecting from receptacle 1, check the movement of lower rocker arm 9 as one end of said arm descends.

Ledges 21 are provided on the inner walls of receptacle 1 in planes paralleling the plane in which rocker arm 9 moves. These ledges 21 are essential to the operation of our machine, since without them the grain or seed will bind between the edges of valve plates 7 and 8, and the walls of receptacle 1, and stop the machine. The lower valve plates 7 and 8 when closed bear against the under side of ledges 21 and said valve plate edges are spaced from the walls of receptacle 1 a distance greater than the maximum dimension of the grain being treated, so that none of said grain will bind between the valve plate edges and the receptacle walls. Flaps 22 of canvas, or other material, deflect the grain to prevent binding around lower shaft 6. Inclines 23 direct the grain against the valve plates 7 and 8 in emptying.

Figure 2:
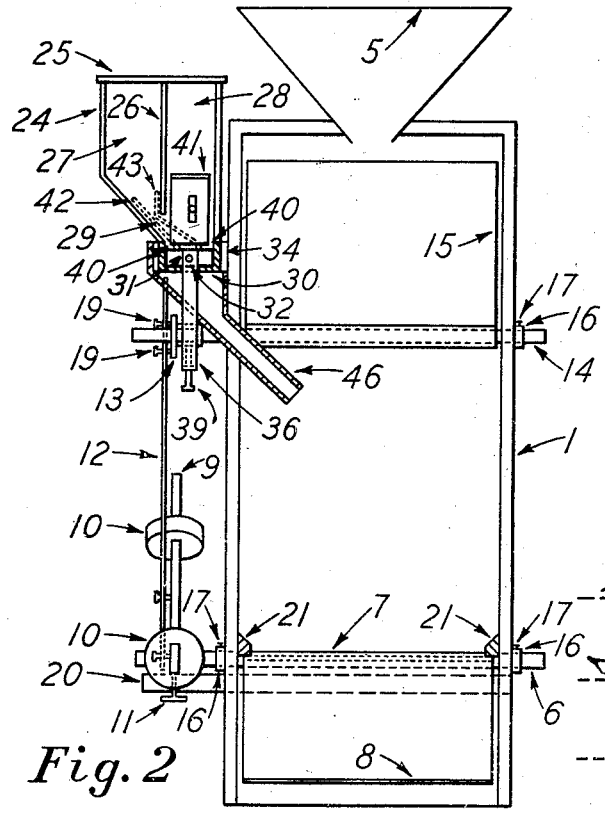
Figure 2 is a side elevation, partly in section.

A hopper 24, for the dust, having a cover 25 is mounted on the side and near the top of receptacle 1, and referring to Figure 2, said hopper 24 is divided by partition 26 into two sections, an offset or supply section 27 and a main or discharge section 28. Partition 26 has its lower edge spaced above the bottom of hopper 24 to provide a passage 29 from the offset supply hopper section 27 to the discharge hopper section 28. Said discharge hopper section 28 is provided with a detachable bottom by means of suitable brackets and bolts (not shown). Below the junction of the offset hopper section 27 and the discharge hopper section 28 is a channel member 30 open at the ends and forming a channel below the junction of the offset and discharge hopper sections and constituting the bottom of said discharge hopper section. A slide 31 resting in the channel member 30, has sliding contact with the bottom and sides thereof, and is adapted to reciprocate in said channel member. The top of slide 31 is positioned below the junction of offset hopper section 27 and discharge section 28.

Rods 32 mounted in the ends of slide 31 are provided with adjustable stop collars 33. A rectangular loop member 34 is secured to the channel member 30 and serves as a support for said channel member. The ends of loop member 34 are provided with guide holes 35 for passage of rods 32. A U-link 36, having holes 37 near the ends thereof, is slidably mounted on rods 32 and has a hole 38 at the center for passage of a finger 39 extending from the upper rocker arm 13. Stop collars 33 are so positioned on rods 32 that one or both of them will always be spaced from U-link 36 so said U-link has initial free sliding movement on rods 32 as finger 39 and upper valve 15 swing from one side to the other, whereby to cushion the movement of the weighted rocker arm 9 and valve plates 7 and 8 toward the end of their movement, without retarding the initial or intermediate movement thereof. Discharge openings 40 for the dust are adjustable by slotted sliding gates 41. Agitators 42 and 43, having upper portions substantially wave-shaped in outline, are mounted on slide 31, extend through passage 29 to the inside of offset hopper section 27, and are adapted to slide along the bottom and side wall of said offset hopper section, respectively. The crests of said wave-shaped agitators 42 and 43 are positioned above, and the troughs are positioned below, the lower edge of partition 26. Chutes 46 extend downwardly and obliquely from the openings in channel support 34 to the interior of compartments 2 and 3 in receptacle 1. A gravity mixing chute of well known design (not shown) or any suitable mixer may be attached below receptacle 1 for further mixing of the grain and dust.

In the operation of our device, grain enters receptacle 1 by gravity from hopper 5 being deflected into compartment 2 by upper valve 15 when in the position shown in Fig. 1. As a predetermined amount of grain has accumulated in compartment 2, its weight bearing against valve plate 7 will exert sufficient counter-clockwise torque to overcome the resultant clockwise torque or leverage action of weights 10 on rocker arm 9 and cause lower valve plate 7 to open and discharge the material. As lower valve plate 7 opens it moves independently of upper rocker arm 13 and upper valve 15 until lower valve plate 8 has nearly closed due to slots 18 and pins 19 in connecting bars 12. Upper valve 15 then quickly shifts to the other side, causing grain to enter compartment 3 and the operation is repeated.

As the upper valve 15 moves, finger 39 imparts motion to U-link 36 which has initial free sliding movement on rods 32 by means of holes 37 until it engages with adjustable stop collar 33 which when it actuates the reciprocating slide 31 which in turn pushes or ejects dust from hopper 24 out one of the open ends of channel member 30. The dust then enters one of the compartments through chute 46 where it mixes with the incoming grain.

The quantity fed may be varied by adjusting the stroke by moving stop collars 33 or by adjusting the height of the discharge opening 40 by raising or lowering the sliding gates 41. By means of the double-acting reciprocating slide 31 equal quantities of the dust are fed from each end thereof.

The slotted connection 12, 18 and 19 between the weighted rocker arm 9 and upper rocker arm 13, and the free travel of U-link 36 on rods 32 provide a stepped cushioning effect as the weighted rocker arm 9 descends and its leverage increases. The dust feeder operates as the weighted lower rocker arm 9 nears the end of its movement, enabling the said rocker arm to exert its greatest leverage action in feeding the fungicide into receptacle 1. This also serves as a cushion to prevent the weighted rocker arm 9 from causing too great a jar as it reaches stop 20.

By employing the dust hopper 24, having an offset supply section 27 and a discharge section 28, the feeding of the dust takes place uniformly under a low and constant head.

By providing lateral openings 40 above the bottom of the discharge hopper section 28, and having the slide or discharge plate 31 substantially the width of said bottom, with no obstruction above the slide to interfere with the free flow of the fungicide dust to the bottom of the channel member 30, practically all of the material will empty from the hopper 24, discharging uniformly in equal amounts with each stroke of the slide 31 from a full to a practically empty dust hopper.

Having thus described our invention, what we claim for Letters Patent is:

1. In a seed dusting apparatus, a seed receptacle having compartments therein, an upper shaft, a valve on said upper shaft, a rocker arm on said upper shaft, a pin on said rocker arm, a lower shaft, a valve on said lower shaft operated by the weight of the seed, a rocker arm on said lower shaft, a bar connecting said rocker arms and having a slot formed therein adapted to receive said pin, whereby motion is not imparted to said upper valve until said lower valve has nearly completed its movement, and a fungicide dust feeder operated by the movement of said upper valve.

2. In a seed dusting apparatus, a seed receptacle having compartments therein, an upper shaft, a valve on said upper shaft, a rocker arm on said upper shaft, a lower shaft, a valve on said lower shaft operated by the weight of the seed, a rocker arm on said lower shaft, a slotted connection between said rocker arms, a ledge attached to the inner walls of said receptacle and serving as a stop for the lower valve when closed, said lower valve in its closed position being spaced from the wall of said receptacle a distance greater than the maximum dimension of the seed, and a dust feeding means operated by the movement of said upper valve for feeding dust into said receptacle.

3. In a seed dusting apparatus, a seed receptacle having compartments therein, an upper shaft, a valve on said upper shaft, a rocker arm on said upper shaft, a lower shaft, a valve on said lower shaft operated by the weight of said seed, a rocker arm on said lower shaft forming an obtuse angle and having an end extending laterally from each side of said shaft, a weight on each of said ends, a bar connecting said rocker arms and having a slot whereby motion is not imparted to said upper valve until said lower valve has nearly completed its total movement, a finger extending from said upper shaft rocker arm, a dust hopper having discharge openings above the bottom thereof, a slide in the bottom of said hopper, a rod in each end of said slide, a stop on each of said rods, a link connecting said finger and said rods and having a limited sliding movement on said rods whereby to cushion the final movement of said valves without retarding the initial or intermediate movements thereof.

4. In a seed dusting apparatus, a seed receptacle having compartments therein, an upper shaft, a valve on said upper shaft, a rocker arm on said upper shaft, a lower shaft, a valve on said lower shaft and operated by the weight of the seed, a bar connecting said rocker arms and having a slot adapted to coact with a pin on said upper shaft rocker arm, a finger extending from said upper shaft rocker arm, a dust hopper on said receptacle comprising an offset supply section and a discharge section, said discharge section having discharge openings above the bottom thereof, a slide in said bottom, a rod in each end of said slide, a stop on each of said rods, a U-link adapted to be operated by said finger mounted on said rods and having its ends spaced from said stops whereby to cushion the valves toward the end of their movement without retarding the initial or prior movement thereof.

5. In a seed dusting apparatus, a hopper for dust having an offset supply section and a discharge section integral therewith, said discharge section having openings near the bottom thereof, a partition between said offset and said discharge sections having its lower edge spaced above the bottom of said hopper sections to provide a passage between said offset and discharge sections, and means for discharging dust through said openings.

WILBUR M. HURST.
FRANKLIN D. FULTON.